Aug. 27, 1963  J. D. HAYES  3,101,658
FOCUS INDICATING MECHANISM FOR FOCUSABLE PHOTOGRAPHIC OBJECTIVES
Filed June 23, 1961
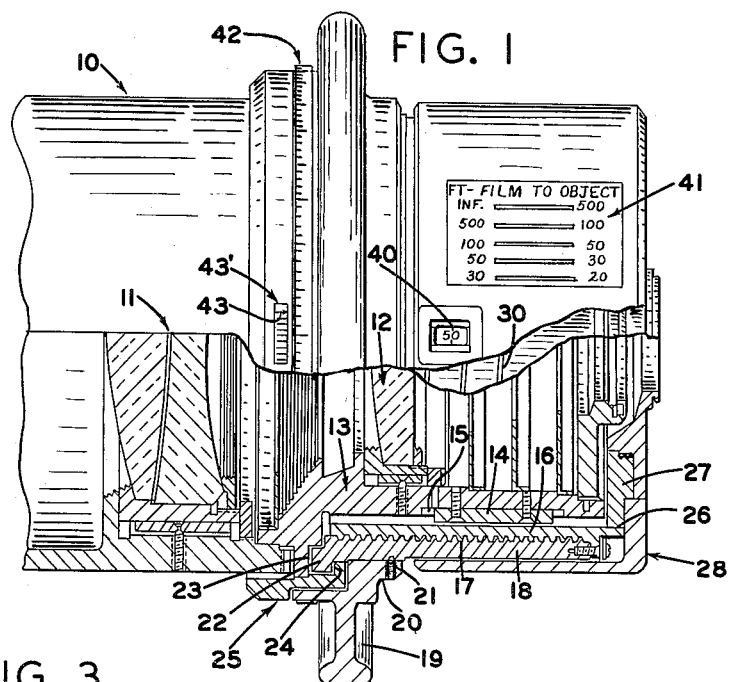
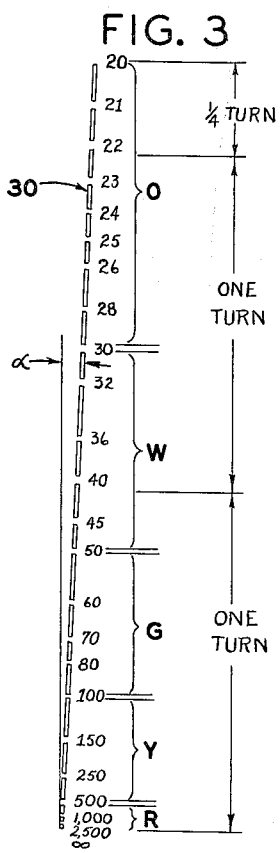
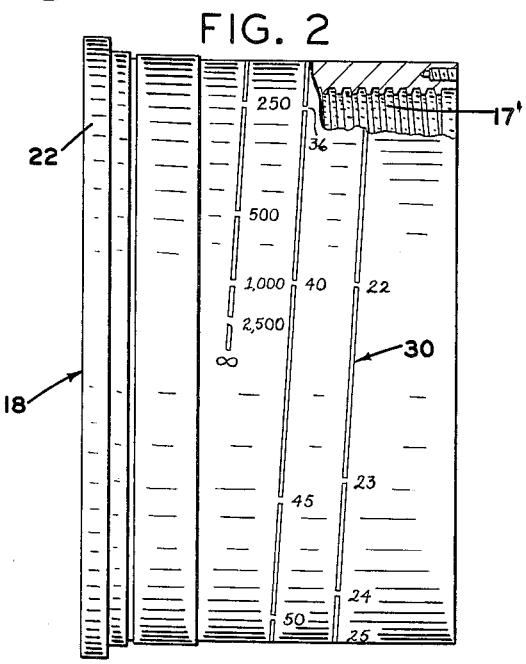
INVENTOR.
JOHN D. HAYES
BY Frank C. Parker
ATTORNEY

United States Patent Office 3,101,658
Patented Aug. 27, 1963

3,101,658
FOCUS INDICATING MECHANISM FOR FOCUS-
ABLE PHOTOGRAPHIC OBJECTIVES
John D. Hayes, Rochester, N.Y., assignor to Bausch &
Lomb Incorporated, Rochester, N.Y., a corporation of
New York
Filed June 23, 1961, Ser. No. 119,211
7 Claims. (Cl. 95—44)

This invention relates generally to photographic objectives and the like and more particularly to improvements in focus indicating mechanisms therefor.

In the past some inconvenience has been experienced in the use of certain classes of high performance photographic objectives due to the lack of a continuous indication of focal condition of the objective and also due to the lack of means for reading precisely the focal distance of the object for any given setting of the focusing mechanism.

It is an object of this invention to provide focusing indicating means of a novel and improved nature for photographic objectives and the like, said means being effective for reading or setting a wide range of focal distances in much more precise manner and within closer limits than customarily done in prior art devices, and furthermore said means being so constructed as to give an approximate and continuous focal distance indication without any discontinuities or gaps.

It is a further object to provide such a device which may be constructed by economical manufacturing processes in such a manner as to be easily assembled and disassembled and wherein the parts are so designed and arranged to maintain reliable optical and mechanical alignment in all of its constituent parts.

Further objects and advantages of this invention will be apparent in the form and arrangement and in the combination of the parts thereof as well as in the details of construction from a study of the specification taken in connection with the drawing in which:

FIG. 1 is a side elevation, shown partly in section and broken away, of a preferred form of this invention, FIG. 2 is a side elevation of a focusing member of the mechanism shown in FIG. 1, and FIG. 3 is a developed view of a part of the surface of a focusing member shown in FIG. 2.

The present invention is shown in its preferred form in FIG. 1 of the drawing wherein only the focusing end of the photographic objective, generally indicated at numeral 10 is shown. Comprised in the photographic objective 10 is an optical system having a plurality of lenses, such as lenses 11 and 12, as well as other lenses not shown and these lenses are mounted in a lens barrel member 13, or are attached positively to the lens barrel member 13 by suitable mechanisms so that all of the lenses in the optical system move during the focusing of the objective in the same way. Said lens barrel member 13 is slidably keyed by means of the key structure 14 which is fixed to said barrel, and a keyway 15 within a concentric supporting sleeve 16 wherein the lens barrel member moves back and forth during focusing operations. On the exterior of the support sleeve 16 a suitable focusing thread 17 is formed and on the thread 17 a focusing sleeve 18 is assembled, said focusing sleeve being manually rotated by a hand wheel 19 fixed thereto to accomplish focusing. The hand wheel 19 is provided with a hub 20 wherein a lock screw 21 is threaded so as to engage in a corresponding locking recess formed in the focusing sleeve 18 to provide said fixed connection.

At the inner end of the focusing sleeve an outwardly projecting flange 22 is formed on the focusing sleeve 18 and said radial flange is longitudinally confined between two radial shoulders 23 and 24 formed respectively on the lens barrel member 13 and on a fixed ring 25 which is solidly attached to said lens barrel member so that rotation of the thread 17' of the focusing sleeve 18 causes endwise motion of the concentric support sleeve 16 therewith. On the rear portion 26 of the support sleeve 16, a disc-shaped end plate 27 is fixed and on plate 27 is non-rotatably demountably attached in any preferred manner a cup-shaped enclosure member 28 which extends forwardly in telescoping relation over the focusing sleeve 18.

According to this invention means for indicating the focal condition of the photographic objective 10 are provided by the combination of four elements or cooperative members which are: a multi-turn spiral focus indicating mark, a window through which said mark may be observed, a segment identification chart, an angular scale carried by the focusing mechanism, and an index mark formed adjacent to the angular scale. Said combination is provided mechanically by forming a segmental spiral focus indicating mark 30 on a smooth cylindrical surface of the focusing sleeve 18, said mark being continued in a straight spiral of aligned segments around a spiral path shown in FIG. 2 of the drawing.

Referring more particularly to FIG. 3 of the drawing, it will be seen that means are provided for dividing said focus indicating mark into subsidiary focal distance zones having specified terminal values, said zones collectively forming a continuous total range from substantially 20 feet up through infinity. Said subsidiary focal distance zones are advantageously formed from mutually distinguishable marks and are preferably formed of different colors. Accordingly, the zone marked from 20 feet to 30 feet is labeled O meaning these marks are colored in orange, the secondary subsidiary focal zone marked W extends from 30 feet to 50 feet and the segmental parts of the mark 30 are colored white, the third subsidiary zone is correspondingly extended from 50 to 100 feet and is colored green, said subsidiary zone being designated by the letter G in FIG. 3. Further designations constitute the fourth and fifth subsidiary focal distance zones which are labeled respectively R and Y for red and yellow and designate respectively distances between 100 and 500 and between 500 and infinity.

A window 40 is formed in the cylindrical wall of the cup-shaped enclosure member 28 directly over the indicating mark 30 so that not only the color of the mark can be detected but also the engraved figure therein. All of the heretofore designated terminal focal distances related to the various subsidiary focal zones are distinctly imprinted on the focusing sleeve at the spaces between the segments of the mark. Within said zones O, W, G, Y, R, other divisions designating intermediate focal ranges are indicated by the spaces between the various short segments, each of which is labeled with a numeral showing its related focal distance as shown in FIG. 3.

Having specified the form and arrangement of the parts of the segmental spiral focusing indicating mark 30, it will be seen that as the hand wheel 19 is turned the focusing sleeve 18 is rotated to bring the various colored zones O, W, G, Y and R successively into view beneath the window 40 and since the linear distance between the various numerals which designate the focal footage are quite widely separated the identified color tells the operator the approximate range of focal distances in which the lens mechanism is set for all intermediate points thereof. Furthermore, since the spiral mark 30 is really a helix and it is desired to maintain the mark 30 properly placed in view through the window 40 while the focusing sleeve 18 is being rotated, it is then necessary to make the angle $\alpha$ of helix of said mark 30 equal or substantially equal to the helix angle of the focusing thread 17.

According to this invention the remaining parts of the novel combination here disclosed include a segment identification chart 41 whereon the various colors are placed opposite the identifying numerals which mark the terminal values of the related zonal focal distances. Said chart 41 is located closely adjacent to the window 40.

As aforesaid, further comprised in the combination is an angular scale ring 42 which may be either suitably fixed to or integrally formed with some structural member which rotates with the focusing sleeve 18. Preferably ring 42 is formed on a part of the hand wheel 19. Along with the angular scale 42 and also comprised in the combination is a suitable index mark 43 of any desired construction which is formed adjacent to the scale on a relatively stationary part of the photographic objective such as the thrust ring 25.

This invention contemplates forming the index mark as a vernier scale 43′ for the sake of enabling the operator to obtain a more precise reading of the scale 40.

In using the focus indicating mechanism above described, the hand wheel 19 is rotated which by virtue of its fixed connection at 21 to the focusing sleeve 18 causes said focusing sleeve to move the support sleeve 16 endwise. Since the enclosure member 28 is fixed to the support sleeve 16, it is caused to move endwise carrying the window 40 with it and keeping it over the mark 30 in all operative positions thereof. As the sleeve 16 moves outwardly it carries with it the lens barrel member 13 and associated parts, thus changing the focal setting of the objective 10. While the hand wheel 19 is being rotated, the angular scale 42 is consequently rotated with respect to its index mark 43 so that primarily an approximate zone of focus is determined by noting the color of the mark 30 whenever a numeral is not seen in the window 40 and consulting the segment identification chart 41 to determine the approximate zone of focal distances corresponding to the indicated color of the mark 30. Secondarily, in order to determine with exactitude the focal range for the distance of the object, the operator observes the indicated reading on the angular scale 42 and further refines the reading by noting the indication on the vernier scale 43. It will be seen that by the coordinated use of the members of the above-recited combination of elements 30, 40, 41, 42 and 43, not only an approximate reading of footage may be obtained at all times but also a very precise value of range may be determined since the combination of the scale 42 and vernier 43 enables the operator to determine distances within unprecedented limits.

It will be seen from the above description that a new and improved focusing mechanism and apparatus is here provided by which the approximate focal setting may be read at all times by the use of the unique focus indicating mark and blank or unknown places in the focal indication are avoided. Furthermore, along with this advantage comes the superior determination of the precise reading of focal distances by the use of the associated angular scale.

Although only a preferred form of this invention has been shown and described in detail, other forms are possible and modifications and changes may be made in the detailed arrangement and form of the parts thereof without departing from the spirit of the invention as claimed herebelow.

What is claimed is:

1. A focus indicating mechanism for a photographic objective or the like having in combination a spiral segmental focus indicating mark formed on a cylindrical surface of said focusing member, the segments of said mark being formed so as to be individually identifiable from each other and each segment designating a given subsidiary range of focal distances within a given total range, a window, and means for mounting said window in a viewing position athwart of and over said mark, a segment identification chart whereon the terminal focal distances related to each said segment are given, an angular scale formed on an annular member which is operably connected to rotate with said focusing member, and an index mark carried contiguously to said scale on a stationary part of said objective whereby the identifying segments when referred to said chart reveal the particular subsidiary range of focal distances at which the focusing member is set and the angular scale gives the specific distance within said subsidiary range.

2. A focus indicating mechanism for a photographic objective or the like having in combination a spiral focus indicating mark of segmental form which is formed on a cylindrical surface of a focusing member, the segments of said mark being formed so as to be individually identifiable in a contrasting manner from each other and each different segment designating a given subsidiary range of focal distances within a given total range, a non-rotatable member overreaching said cylindrical surface, a window formed in said member over and athwart of said mark, a segment identification chart whereon the terminal focal distances related to each said segment are formed, an angular scale formed around the periphery of an annular member which is operatively connected to rotate with said focusing member, and an index mark formed contiguously to said scale on a stationary part of said objective whereby the identifying segments when referred to said chart reveal the particular subsidiary range of focal distances at which the focusing member is set and the angular scale shows the specific distance within said subsidiary range.

3. A focus indicating mechanism for a photographic objective according to claim 2, characterized by said combination further including a vernier scale which is formed adjacent to said index mark on said stationary part and includes said index mark at one end thereof.

4. A focus indicating mechanism for a photographic objective and the like having in combination a rotatable focusing member whereon a cylindrical surface is formed, a segmental spiral multi-turn focus indicating mark formed on said cylindrical surface, the segments of said mark being formed so as to be individually identifiable in a contrasting manner from each other and each different segment designating a given subsidiary range of focal distances within a given total range, a stationary cup-like enclosure member having a part overlying and enclosing said focusing member, a window formed in said cuplike enclosure member over and athwart of said mark, a segment identification chart whereon the terminal focal distances related to each different segment are imprinted, said chart being located in proximity to said window on said enclosure member, an angular scale formed around the periphery of an annular member which is operatively connected to rotate with said focusing member, and an index mark formed beside said scale on a stationary part of said objective whereby the identifying segments when referred to said chart reveal the particular subsidiary range of focal distances at which the focusing member is set and the angular scale gives the specific distance within said subsidiary range.

5. Means for indicating the focal condition of a focusable photographic objective comprising a lens barrel member, a concentric support sleeve in which said barrel is axially slidably keyed, a focusing sleeve journaled on the exterior of said support sleeve, an inclined connection between said sleeves operatively constructed to advance one sleeve along the other upon relative rotation therebetween, a multi-turn spiral focus indicating mark formed on the outer surface of the focusing sleeve, the helix angle of the spiral mark being substantially the same as the helix angle of said inclined connection, said mark being formed of spaced segments which are individually mutually contrastingly colored for identification and each different segment designating a different subsidiary range of focal distances within the total focal distance range of said objective, a window carried non-rotatably by said support sleeve over and across said mark so that the mark is seen therethrough, an annular member carried by and movable with said focusing sleeve, an angular scale formed on the peripheral surface of said annular member, an index mark carried contiguously to said scale on a stationary part of said objective, and a segment identification chart whereon each subsidiary focal distance range is coupled with one of the aforesaid identifying colors whereby the identifying segments when referred to said chart reveal the particular subsidiary range of focal distances at which the focusing member is set within the total range and the angular scale shows the specific distance within said subsidiary range.

6. Means for indicating the focal condition of a focusable photographic objective as set forth in claim 5 and further characterized by a cup-shaped enclosure member carried non-rotatably by said support sleeve and extending in telescoped relation over said focusing sleeve, said member carrying thereon both said window and chart near each other and said window being substantially axially aligned with said index mark so that all of the focal readings may be obtained from one single point of view.

7. Means for indicating the focal condition of a focusable photographic objective comprising a focus indicating spiral multi-turn mark formed in spaced segments around the outer surface of a focusing sleeve which is rotatably mounted therein and has an inclined connection operatively formed to move the lens parts of the objective in response to rotation of said sleeve, the angle of said spiral being substantially the same as the angle of said inclined connection, the individual segments of the mark being distinctively and contrastingly colored and being spaced from each other, the terminal focal distances related to each said segment being imprinted in alignment with the clear area of said window in the spaces between the segments.

References Cited in the file of this patent
FOREIGN PATENTS 830,656    Great Britain _____ Mar. 16, 1960